United States Patent [19]

Farrell

[11] 4,301,100
[45] Nov. 17, 1981

[54] METHOD AND APPARATUS FOR SETTING A CLAMPING LOAD

[75] Inventor: Robert E. Farrell, Springfield, Mass.

[73] Assignee: Package Machinery Company, East Longmeadow, Mass.

[21] Appl. No.: 152,616

[22] Filed: May 23, 1980

Related U.S. Application Data

[62] Division of Ser. No. 80,180, Oct. 1, 1979.

[51] Int. Cl.³ ............................................... B29F 1/06
[52] U.S. Cl. ................................ 264/40.5; 264/328.1; 425/149
[58] Field of Search .................. 264/40.1, 328.1, 40.5; 425/149

[56] References Cited

U.S. PATENT DOCUMENTS

| | | | |
|---|---|---|---|
| 3,579,741 | 5/1971 | Schwartz | 425/149 |
| 3,590,437 | 7/1971 | Annis | 425/149 |
| 3,819,774 | 6/1974 | Eggenberger | 425/149 X |

Primary Examiner—Thomas P. Pavelko

Attorney, Agent, or Firm—McCormick, Paulding & Huber

[57] ABSTRACT

The clamping preload in a molding machine or the like is set by adjusting the length of tie bars which support two die plates for opening and closing movement and a thrust plate. A clamping mechanism of given stroke is positioned between the thrust plate and one of the disc plates, and operates to close the die plates at one limit of the clamping stroke. With the clamping mechanism set at its limit and the tie bars set to establish a slight spacing between the die plates, the length of the tie bars is adjusted by means of a drive motor until the die plates are in contact without substantial preload. The clamping mechanism then opens the die plates and the drive motor is further energized to adjust the length of the tie bars and bring the die plates closer to one another by an amount corresponding to a preselected preload. The adjustment is measured from a high ratio mechanical drive connecting the drive motor to the adjustable tie bars, and the measured adjustment is compared with a desired adjustment corresponding to the preselected preload to deenergize the drive motor when the desired adjustment is reached.

7 Claims, 6 Drawing Figures

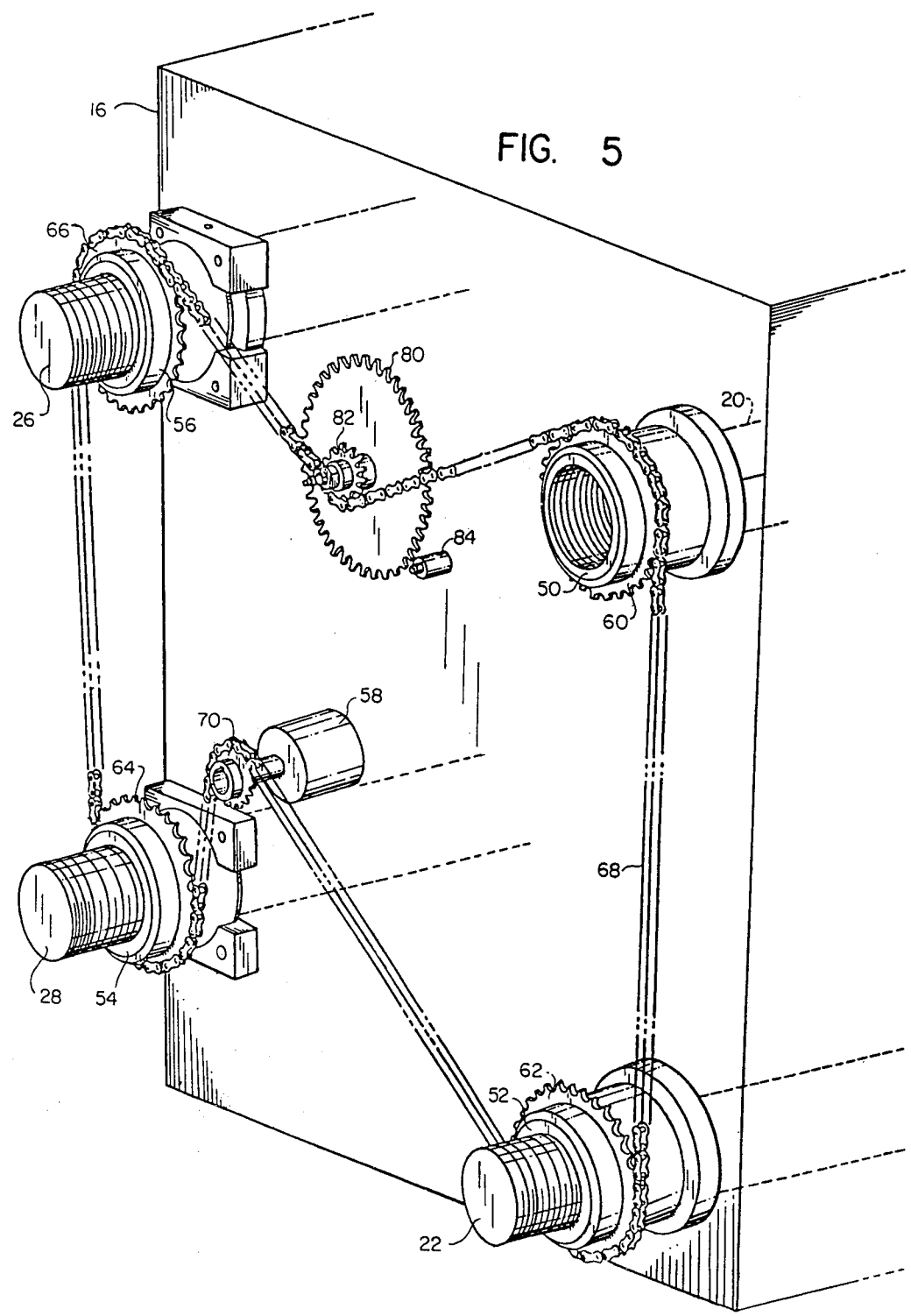

METHOD AND APPARATUS FOR SETTING A CLAMPING LOAD

This is a division, of application Ser. No. 080,180 filed Oct. 1, 1979.

BACKGROUND OF THE INVENTION

The present invention relates to a method and apparatus for setting the preload between die plates such as found in molding, stamping and pressing machines. More particularly, the invention is concerned with setting the preload between two die plates that are operated by a clamping mechanism of given stroke.

In injection molding machines of the prior art, a pair of die plates are reciprocated relative to one another to open and close molds defined or carried by the plates. A toggle linkage is customarily employed to develop the high clamping forces holding the die plates together during the injection process. The linkage reacts the clamping forces through a thrust plate and a set of adjustable tie bars that extend between the thrust plate and the die plates. The clamping load is sometimes referred to as the preload because it is developed by the linkage as soon as the molds are closed.

It is desirable to set the "die height" or preload on the die plates when different molds or other changes are made in the molding machine. The preload is directly related to the amount by which the tie bars are strained when the toggle linkage places the dies in a lock-up condition. Thus, setting the length of the tie bars which are strained between the die plates and thurst plate sets the preload. The effective tie bar length can be set by means of a motor which rotates nuts on the ends of the tie bars and moves the thrust plate relative to the die plates. U.S. Pat. No. 2,498,264 to Goldhard discloses a set of motor-driven nuts of this type and a control mechanism for deenergizing the motor when a particular setting is obtained.

The strain of the tie bars associated with the preload is a small quantity compared to the relative displacement of the die plates in a molding operation; therefore, the mechanism for adjusting that strain must be accurate. In the Goldhard patent referenced above, a limit switch that can be adjusted in position for various preloads is actuated by one of the die plates as the tie bar length for a particular operation is reached. Since the adjustment in length must be set to thousandths of an inch, the limit switch actuated by the die plate, thereby measuring absolute position of the plate, makes accuracy and repeatability difficult to achieve.

It is accordingly a general object of the present invention to provide method and apparatus for setting the preload or die height between two clamped members in molding machines and the like.

SUMMARY OF THE INVENTION

The present invention resides in a machine for molding, stamping, pressing or the like in which a first die plate is reciprocated between open and closed positions relative to a second die plate in a cyclic machine operation. A clamping mechanism for opening and closing the die plates is connected between the first die plate and a thrust plate tied to the second die plate for reacting the clamping load between the plates in a closed position. Drive means used for setting die height moves the thrust plate and the second die plate relative to one another and thereby sets a corresponding clamping load between the plates in the closed position.

Apparatus for establishing a predetermined clamping load between the die plates comprises sensing means operatively connected with the drive means for measuring the movement of the thrust plate and second die plate from one relative position to another by the drive means. For example, the drive means may include a high ratio mechanical drive having a large input displacement and small output displacement that facilitates relative movement of the thrust plate and die plate. A sensor associated with the large displacement input accurately measures displacements of the order needed to set the preload.

The invention also relates to the method by which the preload is set in a machine having a clamping mechanism of given stroke. An adjustable linkage, such as a tie bar, is provided between the clamping mechanism and one of the die plates to adjust the stress in the linkage and the corresponding preload between the plates in the closed position at one limit of the clamping stroke. With the clamping mechanism at the limit, the linkage between the clamping mechanism and one of the die plates is adjusted to a first length which brings the two die plates into a known position relative to one another, for example, in contact without any significant preload. Thereafter, the length of the adjustable linkage is changed by a selected amount from the first to a second length which preloads the die plates correspondingly at the limit of the clamping stroke. The adjustment of the linkage is performed while the clamping mechanism is holding the die plates in spaced relationship so that the adjustment is not opposed by the loads established by the adjustment.

The setting of the linkage for a particular preload can be accomplished automatically by providing motor means for changing the length of the adjustable linkage and a sensor for measuring the change in length as the motor is driven. By comparing the change as it occurs with a desired change and corresponding preload, the motor may be automatically deenergized at the proper adjustment.

A principal advantage of the present invention is that the preload setting is obtained more accurately by measuring incremental changes in the length of the adjustable linkage from a known positional relationship of the die plates. Small relative movements are measured rather than an absolute position of the thrust plate. The method and apparatus allow changes in the preload to be rapidly set in the machine, and the preload for particular molds, clamps or other devices may be recorded and reestablished at any time without difficulty.

BRIEF DESCRIPTION OF THE DRAWINGS

FIG. 5 is a perspective view showing the backside of the thrust plate and the preload adjusting apparatus in the molding machine of FIG. 1.

DESCRIPTION OF THE PREFERRED EMBODIMENTS

Figure 1:
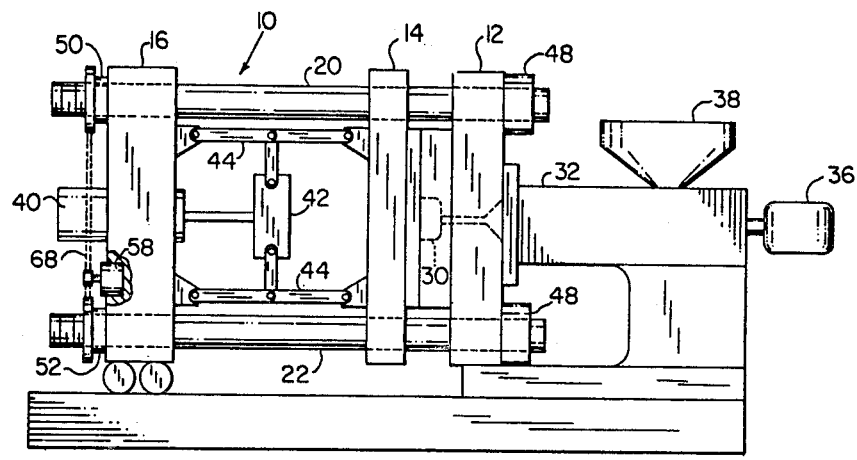
FIG. 1 schematically illustrates an injection molding machine in which the present invention is employed, and shows the machine with the die plates closed.

FIG. 1 illustrates an injection molding machine, generally designated 10, incorporating and utilizing the concepts of the present invention. The machine 10 has a stationary die plate 12, a movable die plate 14 and a thrust plate 16, all of which are mounted in parallel relationship with one another on four tie bars 20, 22, 24, 26 as shown in FIGS. 1 and 5. The die plate 12 includes a mold cavity 30 which is supplied with melted plastic or other settable material from a heated injection cylinder 32. The injection cylinder receives the plastic material in powdered or pellet form through the hopper 38 and a charge of the material is loaded into the cylinder by means of a rotary drive motor 36 at the end of the cylinder opposite from the mold 30. The die plate 14 includes a parison pin 34 (FIG. 2) which defines the shape of an object to be formed from the settable material in conjunction with the cavity 30.

During a molding operation the die plates are moved to a closed position such as illustrated in FIG. 1 and are clamped together with a preload sufficient to withstand the injection pressures and prevent separation or movement at the interface of the die plates. Flashing, that is, a thin film of plastic emanating from the molded part at the seam between separated or moved die plates, is prevented by the preload which may be on the order of several hundred tons for large machines.

In the illustrated molding machine 10, the clamping force is produced by a clamping mechanism including a hydraulic cylinder 40 mounted in the thrust plate 16 and a toggle mechanism actuated by the cylinder 40 and including a cross-head 42 and upper and lower toggle linkages 44. When the cylinder 40 has been extended as shown in FIG. 1, the toggle linkages 44 in the toggle position produce the preload between the die plates 12 and 14, and that load is reacted from the die plate 14 and the toggle linkages through the thrust plate 16 to the tie bars 20–26 and the die plate 12. The preload which is reacted through the tie bars elongates or strains the bars by an amount which is directly proportional to the load. The fixed nuts 48 in FIG. 1 on the one end of the tie bars and the adjusting nuts 50, 52, 54 and 56 in FIGS. 1 and 5 on the opposite ends of the tie bars establish the effective length of the tie rods supporting and strained by the preload. By increasing or decreasing the length of the tie bars, the preload is set since the toggle linkages 44 in conjunction with the cylinder 40 have a given or fixed stroke and always clamp the die plates in the toggle position at the one limit of the stroke.

To this end, the adjusting nuts 50–56 shown in greater detail in FIG. 5 are rotatably driven and adjust the length of the tie bars 20–26 respectively. (The tie bar 20 is intentionally omitted in the nut 50 in order to illustrate the threading therein). The nuts 50–56 are driven simultaneously by means of a drive motor 58 and a chain-and-sprocket system including sprockets 60, 62, 64 and 66 mounted respectively on the adjusting nuts 50, 52, 54, 56 and a common chain 68. The adjusting nuts 50–56 together with the sprockets 60–66, the drive chain 68 and the drive sprocket 70 on the shaft of the motor 58 constitute a high ratio mechanical drive or reduction drive from the motor 58 primarily due to the threading between the nuts and the tie bars and the relative sizes of the sprockets 60–66 and the drive sprocket 70. As a result a relatively large rotational displacement, that is, several rotations of the motor drive shaft, produce a relatively small axial displacement of the adjusting nuts and the thrust plate 16 on the tie bars. Of course, the effective length of the tie bars changes correspondingly, and an accurate setting of the preload is brought about as described in greater detail below.

Figure 2:
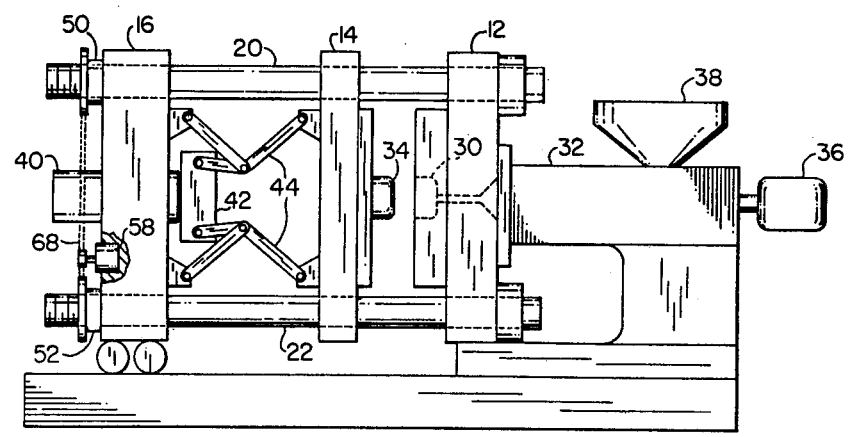
FIG. 2 illustrates the injection molding machine in FIG. 1 with the die plates in an open position.
Figure 3:
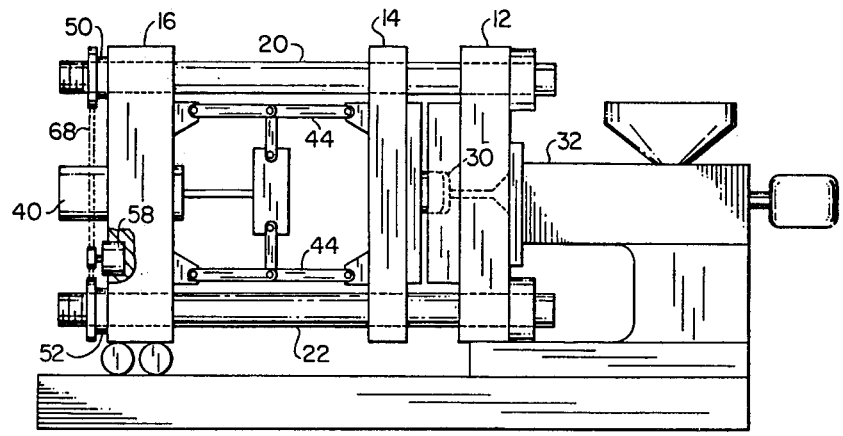
FIG. 3 illustrates the molding machine in FIG. 1 with the length of the tie bars set to establish clearance between the die plates when the clamping mechanism is at one limit of its stroke.

To establish a predetermined preload between the die plates 12 and 14, the adjusting nuts 50–56 are rotated by the drive motor 58 until the die plates 12 and 14 are clearly separated when the toggle linkages are extended in the toggle position as shown in FIG. 3. Preferably the hydraulic cylinder 40 is first actuated to draw the die plate 14 away from the die plate 12 as shown in FIG. 2 so that a relatively low power motor 58 can rotate the adjusting nuts in the counter-clockwise direction and backoff the adjusting nuts without a clamping load. It will be understood that since the sprockets, drive chain and nuts constitute a high ratio drive, and adjustment of the die plates can be carried out at a no load condition, the motor 58 only needs to produce enough power to overcome friction and make the desired adjustment.

After the die plates have been separated, the drive motor 58 is energized to rotate the adjusting nuts 50–56 and move the thrust plate 16, the die plate 14, and extended toggle linkages 44 toward the stationary die plate 12. When the die plate 14 makes contact with the plate 12 without any substantial preload, that is, when the die plates are "kissing," the drive motor 58 is deenergized. Preferably the motor 58 is allowed to drive the plate 14 against the plate 12 until the motor stalls and then the motor is deenergized. In this fashion a uniform reference point is established for subsequent steps in setting the preload.

It will be understood that further adjustment of the drive nuts 50–56 beyond the positions in which the die plates 12 and 14 are brought into "kissing" relationship, results in extension or strain of the tie rods when the die plates are closed, and locked up, and produces a corresponding preload of the die plates against one another. Such adjustment of the tie rods can be measured with high accuracy by means of a displacement sensor connected with the input end of the high ratio drive mechanism between the motor 58 and the tie rods 20–26. The sensor does not need to be a high accuracy displacement sensor because the displacement of the chain 68 by the motor 58 is relatively large compared to the displacement of the adjusting nuts and thrust plate 16 on the tie rods, the displacements being related by the ratio of the mechanical drive.

To this end a displacement sensor comprised by a toothed plate 80 and a proximity switch 84 is driven from the chain 68 by means of a sprocket 82. The proximity switch may be an optical or magnetic sensor which detects each tooth of the plate and produces a corresponding output pulse as the plate is rotated by the sprocket in front of the switch. Each pulse represents an incremental displacement of the chain 68 and an infinitesimal change in the effective length of the tie bars 20–26. The difference in diameter of the toothed plate 80 and the sprocket 82 improves the resolution of chain displacement sensed by the switch 84, and the proportional displacement and adjustment of the nuts.

Figure 4:
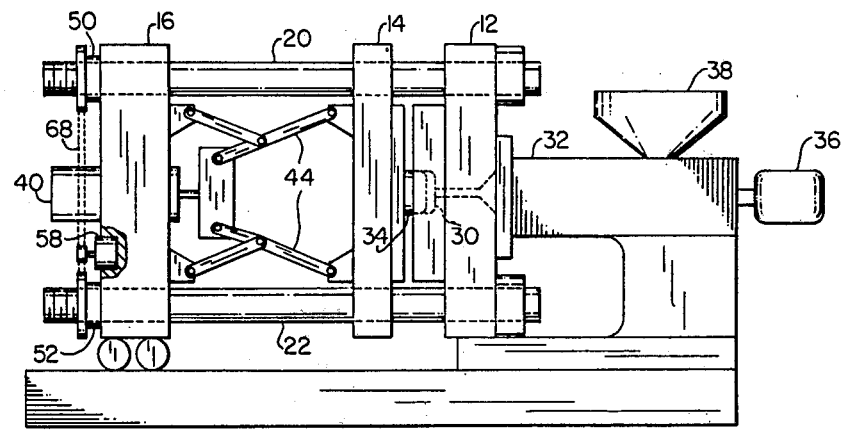
FIG. 4 illustrates the molding machine of FIG. 1 during the step of adjusting the length of the tie bars.

The proximity switch 84 is only used to measure the nut adjustment from the reference position established by bringing the die plates into kissing relationship and the final position that establishes the preload. Since the drive motor 58 is not capable of driving the adjusting nuts 50-56 while the die plates 12 and 14 are in kissing relationship, it is necessary to open the die plates by means of the clamping mechanism as shown in FIG. 4. The toggle linkages 44 are pulled from their toggle position and then the drive motor 58 is energized.

The movement of the adjusting nuts 50-56 and the thrust plate 16 relative to the tie bars 20-26 is measured by counting the pulses from the proximity switch 84. With a direct relationship existing between the number of pulses and nut displacement, and since the displacement can be related to the preload or lockup load by virtue of the spring constant of the system, the output pulses of the switch 84 are a measure of the preload that will exist between the die plates 12 and 14 when the toggle linkages 44 are subsequently placed in their toggle position. Thus, a table of values representing the number of pulses generated by the proximity switch can be established for given preloads of the molding machine 10.

To use the preload table of values it will be, of course, necessary to determine how much preload is required for a given set of molds. When the smallest preload that properly produces articles from a particular set of molds has been determined, the machine can be set and reset time and time again at that preload by carrying out the adjusting process described above and matching the pulse count from the proximity switch with the table value. The preloads are accurate since the pulse count represents the large displacement input of the high ratio drive, and the accurate setting is made without a great deal of difficulty from the output signals of the switch.

The capability of setting the preload is highly desirable since many different molds are used in injection molding machines, and each set of molds requires a unique preload to properly form the molded articles. An alternative is to preload the die plates at the maximum tonnage of the machine all of the time; however, such a procedure needlessly reduces the life of the mold, and may also reduce the life of the machine by requiring the machine to cycle at higher stress levels which accelerate wear and failure due to fatigue. Consequently, the ability to adjust the preload accurately and to repeatedly set a particular preload in the machine offers greater flexibility of the machine in the hands of the customer and a longer useful life of the molds and machine.

Figure 6:
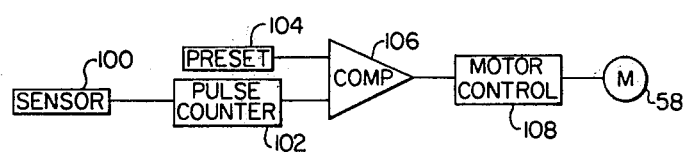
FIG. 6 is a schematic drawing of the control circuit.

FIG. 6 is a schematic diagram of machine controls that allow the preload of the molding machine 10 to be set automatically after a desired preload has been programmed in the machine. A sensor 100 is provided to measure the relative movement of the adjusting nuts 50-56 along the tie bars 20-26. For example, the toothed plate 80, sprocket 82 and the proximity switch 84 in FIG. 5 provide an accurate measure of the nut displacement and hence, are quite suitable for the sensor 100 in FIG. 6. As a pulse generator, the proximity switch 84 produces a pulsed output signal proportional to the displacement, and that signal is transmitted to a pulse counter 102 for conversion to a digital or analog signal of corresponding value. The pulse counter is only energized to record the pulse count during the interval in which the drive motor 58 is energized to move the thrust plate 16 from the reference position that brings the die plates 12 and 14 into kissing relationship and the adjusted position which produces the desired preload between the die plates. In this manner the pulse count represents the relative movement of the thrust plate from the reference position rather than an absolute position.

The pulse count is then compared with a count stored in a preset memory 104 that has been programmed with a pulse count corresponding to a desired preload. Comparison of the programmed count in the memory 104 and the actual count in the counter 102 is made by the comparator circuit 106 to determine when the counts are the same, and when a coincidence of the counts is detected, the comparator deenergizes the drive motor 58 automatically through the motor control 108. When the motor is deenergized, rotation of the nuts 50-56 stops and the thrust plate 16 is then in a position along the tie bars 20-26 that produces the predetermined preload when the toggle linkages 44 of the clamping mechanism close the die plates and hold the plates in a preloaded state at the toggle position.

Accordingly, an apparatus and method have been disclosed for preloading the die plates of a molding machine in a simple, high accuracy and speedy process. Accuracy is achieved by utilizing a sensor which measures only relative movement of the adjusting linkage, that is, tie bars which connect the clamping mechanism with the die plates. The sensor also provides an accurate measure for preloading the plates since it operates upon the large displacement input of a high ratio mechanical drive adjusting that linkage. The speed with which an operator of the machine can set a particular preload is improved by the simplicity of the controls and their use in the process.

While the present invention has been described in a preferred embodiment, it should be understood that numerous modifications and substitutions can be had without departing from the spirit of the invention. For example, although the invention has been disclosed in a molding machine, its utility is not limited in this respect but has applicability to stamping, cutting and other types of pressing machines in which a clamp mechanism is required to load the die plates. Toggle linkages 44 are typically used in machines of this type, but other types of clamping mechanisms having a given stroke may also be used. The proximity switch serving as a pulse generator for measuring the incremental displacement of the adjusting nuts and thrust plate from one position to another with high accuracy is but one of a plurality of displacement transducers that can serve the measuring function. Accordingly, the present invention has been described in a preferred embodiment by way of illustration rather than limitation.

I claim:

1. A method of setting the preload between two die plates that are moved between opened and closed positions by means of a clamping mechanism of given stroke comprising:

providing an adjustable linkage between the clamping mechanism of given stroke and one of the die plates opened and closed by the clamping mechanism to adjust the stress in the linkage and the corresponding preload between the plates in the closed position at one limit of the clamping mechanism stroke;

adjusting the linkage between the clamping mechanism and said one of the die plates to a first length which separates the two die plates when the clamping mechanism is at said one limit of the stroke;

with the clamping mechanism at said one limit of the stroke, adjusting the linkage between the clamping mechanism and said one of the die plates from the first length to a second length which brings the two die plates into a known position relative to one another; and then moving the clamping mechanism from said one limit of the given stroke toward the other limit to establish a separation between the die plates with the adjustable linkage at the second length; and then changing the length of the adjustable linkage by a measured amount from the second length to a third length which preloads the die plates in the closed position by a corresponding amount when the clamping mechanism is subsequently returned to said one limit of the clamping mechanism stroke.

2. A method of setting the preload as defined in claim 1 wherein the step of adjusting the linkage to a second length which brings the two die plates into a known position comprises bringing the two die plates together without any significant preload.

3. A method of setting the preload between two die plates as defined in claim 2 wherein:

the step of providing an adjustable linkage includes providing a motor and drive means of sufficient size and strength for adjusting the length of the linkage only when the die plates are separated and not under load; and the step of adjusting the linkage from the first to a second length comprises energizing the motor and drive means to adjust the length of the linkage and move the die plates together, and allowing the motor to bring the plates together and stall without significant preload.

4. A method of setting the preload between two die plates as defined in claim 1 wherein the step of changing the length of the adjustable linkage includes measuring the change in length of the linkage from the second to the third length and producing a signal indicative of the measured change to confirm a change by the measured amount.

5. A method of setting the preload as defined in claim 4 wherein:

the step of providing includes providing a motor for adjusting the length of the linkage;

the step of changing the length of the adjustable linkage comprises energizing the motor, comparing the produced signal for the change in length of the linkage with a predetermined value for the signal at a predetermined change in length and corresponding preload; and automatically deenergizing the motor when the produced signal and the predetermined value are the same.

6. A method of setting the preload between two die plates as defined in claim 1 wherein the step of providing an adjustable linkage between the clamping mechanism and one of the die plates comprises providing a thrust plate and mounting the thrust plate and the two die plates on adjustable length tie bars with the thrust plate and said one of the die plates at opposite sides of the other of the die plates, and the clamping mechanism connected between the other of the die plates and the thrust plate.

7. A method of setting the preload between two die plates as defined in claim 1 or 6 wherein the clamping mechanism comprises a toggle linkage connected to move the die plates toward the closed position at the one limit of the stroke defined by the toggle position of the linkage.

* * * * *